United States Patent
Cheng et al.

(10) Patent No.: US 7,986,874 B2
(45) Date of Patent: Jul. 26, 2011

(54) CAMERA DEVICE AND METHOD FOR TAKING PHOTOS

(75) Inventors: Che-Hsiung Cheng, Tu-Cheng (TW); Hsiu-Min Cheng, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 0 days.

(21) Appl. No.: 12/701,727

(22) Filed: Feb. 8, 2010

(65) Prior Publication Data

US 2011/0158623 A1 Jun. 30, 2011

(30) Foreign Application Priority Data

Dec. 30, 2009 (CN) .......................... 2009 1 0312747

(51) Int. Cl.
*G03B 3/00* (2006.01)
*G03B 17/00* (2006.01)

(52) U.S. Cl. ........................................ 396/102; 396/263
(58) Field of Classification Search ................ 396/65, 396/102, 263
See application file for complete search history.

(56) References Cited

U.S. PATENT DOCUMENTS

| | | | |
|---|---|---|---|
| 2002/0110373 A1* | 8/2002 | Engle et al. | 396/263 |
| 2007/0019941 A1* | 1/2007 | Cross et al. | 396/263 |
| 2008/0298796 A1* | 12/2008 | Kuberka et al. | 396/263 |

* cited by examiner

*Primary Examiner* — Rodney E Fuller
(74) *Attorney, Agent, or Firm* — Raymond J. Chew

(57) ABSTRACT

A method and a camera device that includes a proximity sensor that senses a current distance between a user and the camera device. The method and camera device acquires the current distance sensed by the proximity sensor, and triggers the camera device to take a photo of an object when the current distance is less than a preset distance of the camera device.

6 Claims, 3 Drawing Sheets

CAMERA DEVICE AND METHOD FOR TAKING PHOTOS

BACKGROUND

1. Technical Field

Embodiments of the present disclosure relate generally to camera devices, and more particularly, to a method of taking photos using a camera device.

2. Description of Related Art

Blurred photos resulting from camera shake commonly occur in photography due to press of a shutter of a camera device.

Therefore, there is a need for an improved camera device and method for taking photos to address the above-mentioned problem.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
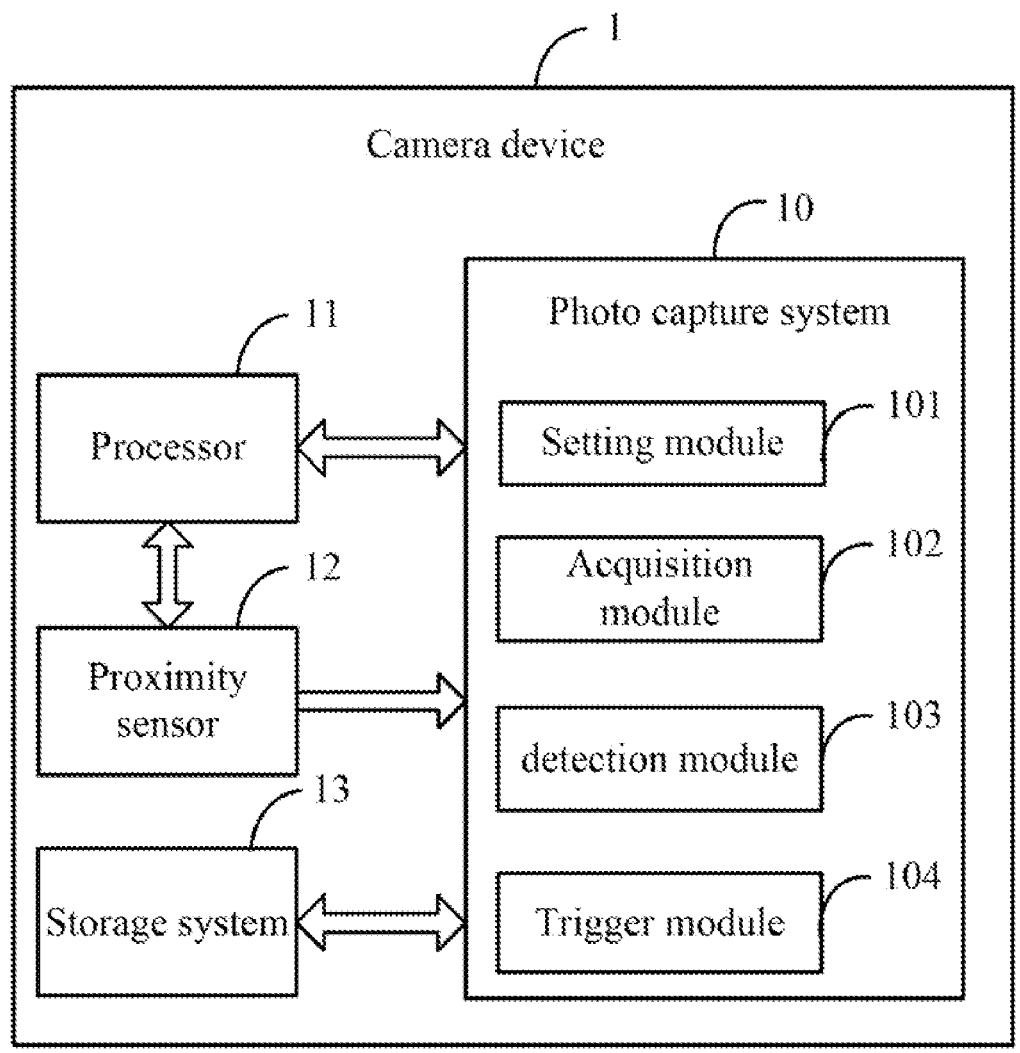
FIG. 1 is a block diagram of one embodiment of a camera device.

FIG. 1 is a block diagram of one embodiment of a camera device 1. The camera device 1 may be used to take photos while reducing camera shake. In the embodiment, the camera device 1 may include a photo capture system 10, a processor 11, a proximity sensor 12, and a storage system 13. In one embodiment, the camera device 1 may be a digital camera, a mobile phone, a personal digital assistant, or other camera-equipped electronic devices. It should be apparent that FIG. 1 is only one example of the camera device 1 architecture that can be included with more or fewer components than shown in other embodiments, or a different configuration of the various components.

The processor 11 executes one or more computerized operations of the camera device 1 and other applications, to provide functions of the camera device 1. The storage system 13 stores one or more programs, such as programs of an operating system, other applications of the camera device 1, and various photos, video or data files. In one embodiment, the storage system 13 may be random access memory (RAM) for temporary storage of information, and/or a read only memory (ROM) for permanent storage of information. In other embodiments, the storage system 13 may also be an external storage device, such as a hard disk, a storage card, or a data storage medium.

The proximity sensor 12 senses a current distance between a user and the camera device 1 in real time when a photographing function of the camera device 1 is activated. The proximity sensor 12 can sense objects within different radial ranges according to different precisions of the proximity sensor 12. In one embodiment, assuming that the maximum sensing distance of the proximity sensor 12 is 1 meter (m), the proximity sensor 12 may sense all the objects in a radial range based on the maximum sensing distance. The radial range may be a sphere having the proximity sensor 12 as the center point of the sphere, with a 1 l radius.

The photo capture system 10 triggers the camera device 1 to take a photo if the current distance is less than a preset distance of the camera device 1, such as 25 mm, for example. In one embodiment, the photo capture system 10 includes a setting module 101, an acquisition module 102, a detection module 103, and a trigger module 104. One or more computerized codes of the function modules 101-104 may be stored in the storage system 13, and can be executed by the processor 11 to perform operations of the camera device 1. In general, the word "module," as used herein, refers to logic embodied in hardware or firmware, or to a collection of software instructions, written in a programming language, such as, for example, Java, C, or Assembly. One or more software instructions in the modules may be embedded in firmware, such as an EPROM. The modules described herein may be implemented as either software and/or hardware modules and may be stored in any type of computer-readable medium or other storage device.

The setting module 101 sets the preset distance between a user and the camera device 1, and store the preset distance in the storage system 13 of the camera device 1. The preset distance can be set according to user requirements. In one embodiment, the preset distance can be defined as 20 mm, 30 mm, or 40 mm, for example. If the distance is not preset, a default distance may be defined as the preset distance, such as 25 mm, for example. The preset distance cannot be predefined that is greater than a maximum distance, such as 50 mm, for example.

The acquisition module 102 monitors a current distance sensed by the proximity sensor 12 in real time, and obtains the current distance from the proximity sensor 12. The detection module 103 detects if the current distance is less than the preset distance of the camera device 1.

The trigger module 104 triggers the camera device 1 to take a photo of an object when the current distance is less than the preset distance.

Figure 2:
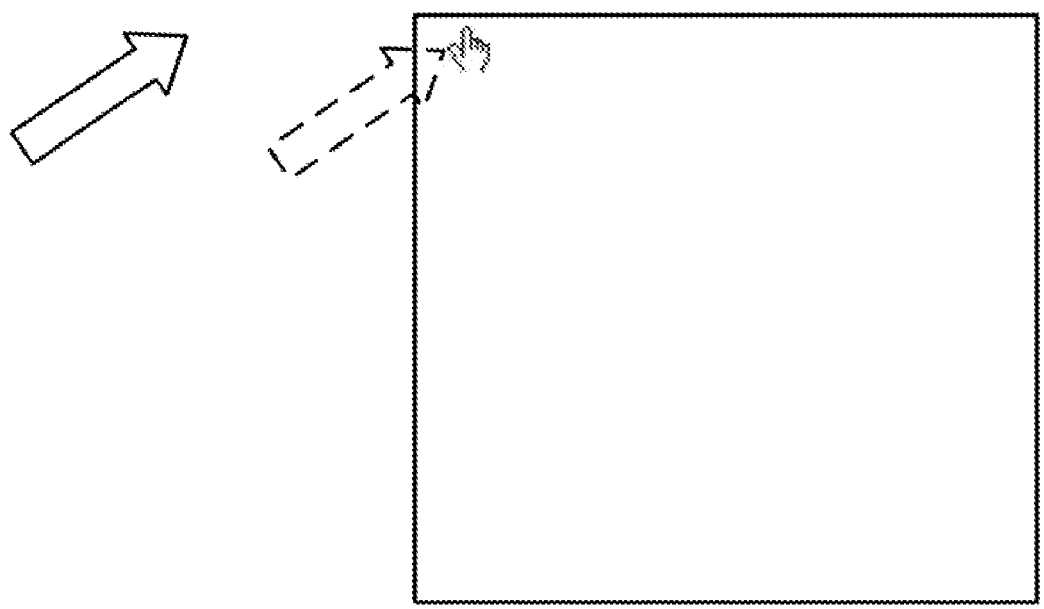
FIG. 2 is a schematic diagram of a user interface of the camera device 1.

FIG. 2 is a schematic diagram of a user interface of the camera device 1. In one embodiment, the camera device 1 displays an indicator icon on the user interface of the camera device 1. In one example with respect to FIG. 2, the indicator icon is a finger-shaped icon displayed on the user interface. The user can take a photo of an object by moving his/her finger towards the indicator icon, whereupon the proximity sensor 12 senses a distance between the finger and the camera device 1 in real time. The camera device 1 takes a photo of the object when the distance between the finger and the camera device 1 is less than the preset distance. As aforementioned, the user can take a photo of the object without pressing a shutter of the camera device 1 or touching a screen of the camera device 1, thereby avoiding camera shake.

Figure 3:
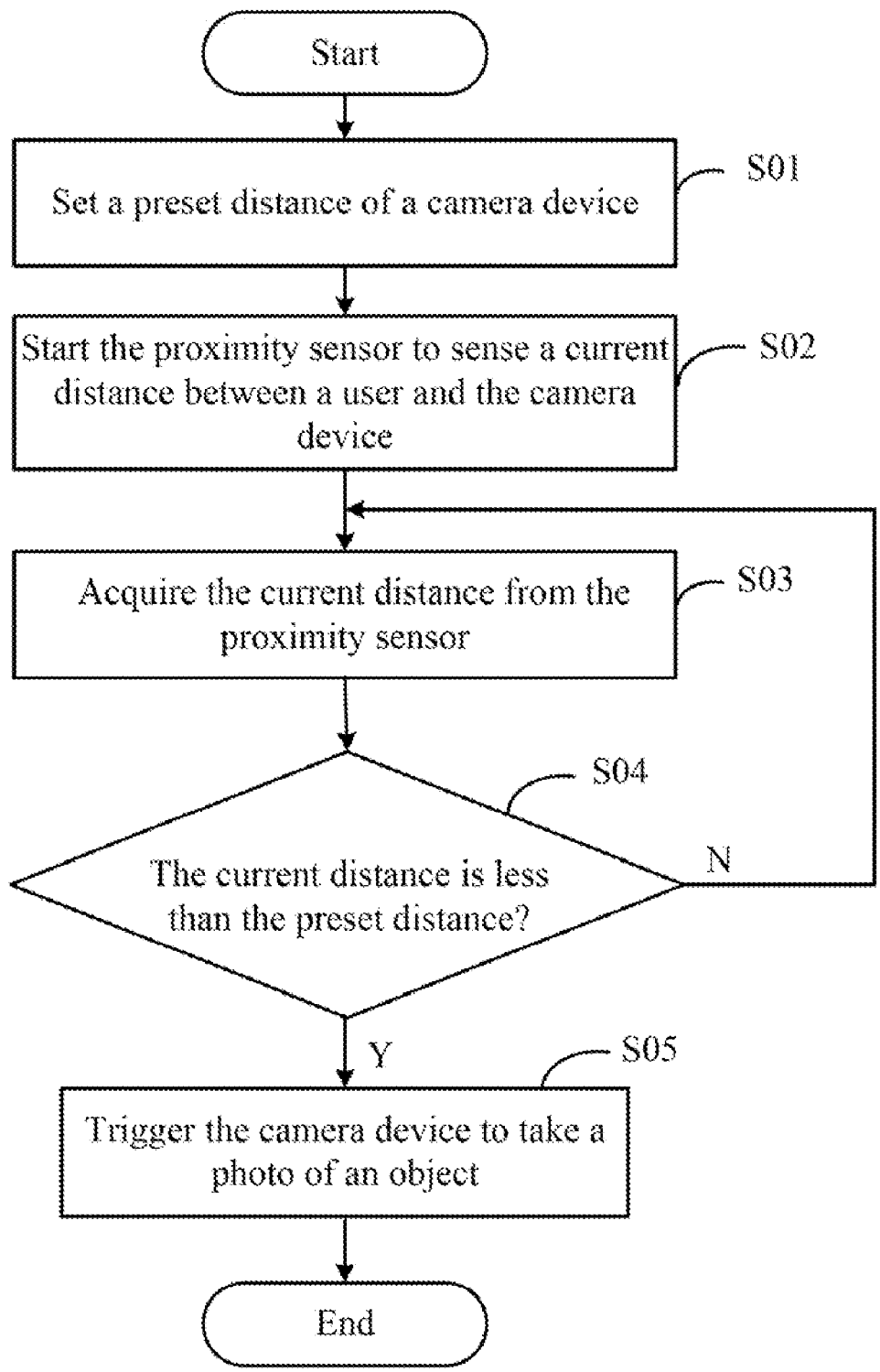
FIG. 3 is a flowchart of one embodiment of a method for taking photos by the camera device 1 of FIG. 1.

FIG. 3 is a flowchart of one embodiment of a method for taking photos by the camera device 1 of FIG. 1. Depending on the embodiment, additional blocks may be added, others removed, and the ordering of the blocks, may be changed.

In block S01, the setting module 101 sets a preset distance between a user and the camera device 1, and stores the preset distance in the storage system 13 of the camera device 1. The preset distance can be set according to user requirements. In one embodiment, the preset distance can be defined as 20 mm, 30 mm, or 40 mm, for example. If the distance is not preset, a default distance may be defined as the preset distance, such as 25 mm, for example. The preset distance cannot be predefined that is greater than a maximum distance, such as 50 mm, for example.

In block S02, the camera device 1 starts the proximity sensor 12 to sense a current distance between a user (or a part/portion of the user) and the camera device 1 when a photographing function of the camera device is activated.

In block S03, the acquisition module 102 monitors the current distance sensed by the proximity sensor 12 in real time, and acquires the current distance from the proximity sensor 12.

In block S04, the detection module 103 detects if the current distance is less than the preset distance. If the current distance is not less than the preset distance, the procedure returns to block S03.

Otherwise, if the current distance is less than the preset distance, in block S05, the trigger module 104 triggers the camera device 1 to take a photo of an object. As aforementioned, the user can take a photo of the object without pressing a shutter of the camera device 1 or touching a screen of the camera device 1, thereby avoiding camera shake.

All of the processes described above may be embodied in, and fully automated via, functional code modules executed by one or more general purpose processors of a camera device. The functional code modules may be stored in any type of readable medium or other storage devices. Some or all of the methods may alternatively be embodied in specialized camera devices.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for taking photos by a camera device comprising a proximity sensor, the method comprising:
    sensing a current distance between a user and the camera device using the proximity sensor when a photographing function of the camera is activated;
    acquiring the current distance sensed by the proximity sensor in real time;
    detecting whether the current distance is less than a preset distance of the camera device;
    triggering the camera device to take a photo of an object when the current distance is less than the preset distance, wherein the camera device displays an indicator icon on a user interface of the camera device to guide the user to take a photo of the object by movement of a part of the user towards the indicator icon.

2. The method according to claim 1, further comprising:
    setting the preset distance according to determined requirements; and
    storing the preset distance in a storage system of the camera device.

3. A camera device, the camera device comprising:
    a proximity sensor;
    a storage system;
    at least one processor; and
    one or more programs stored in the storage system and being executable by the at least one processor, the one or more programs comprising:
    an acquisition module operable to acquire a current distance between a user and the camera device that is sensed by the proximity sensor in real time when a photographing function of the camera device is activated;
    a detection module operable to detect if the current distance is less than a preset distance of the camera device; and
    a trigger module operable to trigger the camera device to take a photo of an object if the current distance is less than the preset distance, wherein the camera device displays an indicator icon on a user interface of the camera device to guide the user to take a photo of the object by movement of a part of the user towards the indicator icon.

4. The camera device according to claim 3, wherein the one or more programs further comprise:
    a setting module operable to set the preset distance according to determined requirements, and store the preset distance in the storage system.

5. A non-transitory storage medium storing a set of instructions, the set of instructions capable of being executed by a processor of a camera device to perform a method for taking photos, the method comprising:
    sensing a current distance between a user and the camera device using the proximity sensor when a photographing function of the camera is activated;
    acquiring the current distance sensed by the proximity sensor in real time;
    detecting whether the current distance is less than a preset distance of the camera device;
    triggering the camera device to take a photo of an object when the current distance is less than the preset distance, wherein the camera device displays an indicator icon on a user interface of the camera device to guide the user to take a photo of the object by movement of a part of the user towards the indicator icon.

6. The non-transitory storage medium as claimed in claim 5, wherein the method further comprises:
    setting the preset distance according to determined requirements, and storing the preset distance in a storage system of the camera device.

* * * * *